INVENTORS
WARREN E. WINSCHE
MELVIN M. LEVINE
BY

United States Patent Office 3,335,061
Patented Aug. 8, 1967

3,335,061
METHOD OF OPERATING A BREEDER REACTOR
Warren E. Winsche, Bellport, and Melvin M. Levine, Port Jefferson, N.Y., assignors to the United States of America as represented by the United States Atomic Energy Commission
Filed Jan. 6, 1966, Ser. No. 519,162
1 Claim. (Cl. 176—17)

ABSTRACT OF THE DISCLOSURE

A method of operating a breeder nuclear reactor. The fuel consists of modules containing mixtures of fertile and fissile materials. The modules are programmed for periodic movement toward the center of the reactor core where the modules are removed. Fresh modules are inserted at the outer limits of the core.

---

Figure 1:
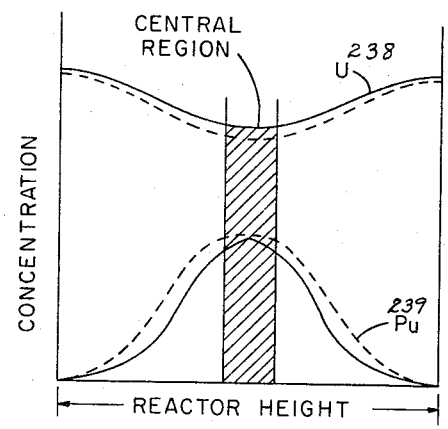

The invention described herein was made in the course of, or under, a contract with the United States Atomic Energy Commission.

This invention relates to a method of operating a breeder type nuclear fission reactor in which the fuel is manipulated at regular intervals to maintain the most efficient arrangement of fertile and fissile material.

In a breeder type nuclear fission reactor, fissile material is provided by which to obtain and maintain criticality while fertile material is provided in a zone where it will be subjected to a neutron flux to convert the fertile nuclei into fissile nuclei. The newly produced fissile material is then removed and processed prior to being used in a nuclear reactor. It has been proposed that a breeder reactor may be designed in which, instead of removing the newly converted fissile material, this material may be used in situ to continue the criticality of the reactor, that is, the newly formed fissile material would replace the depleted fissile material. In this way it would be possible to operate a breeder type of reactor in which the fissile material made in situ would constitute a significantly large part, or in some cases, all of the fissile material needed for the chain reaction. Thus only a small part, or none, of the necessary fissile material is obtained through chemical processing and reconstitution of the output of the nuclear reactor. As the costs of processing represent significant costs in the operation of nuclear reactors, the elimination or reduction of such costs should reduce substantially the costs of nuclear power derived from breeder reactors.

In accordance with this invention, fertile and fissile material distributed within a breeder reactor is manipulated at regular intervals during operation of the reactor in what is referred to as countercurrent fashion. In this invention, the manipulation differs both qualitatively and quantitatively from other concepts in which fissile and fertile materials are used and where some manipulation takes place. Qualitatively, the reactor fuel is moved progressively and in an organized fashion from positions where the reactivity effect of the fuel is small to positions of relatively large reactivity effect. These are called positions of low and high statistical weight, respectively. Fresh fuel is introduced at the low statistical weight positions and spent fuel is removed at high weight positions. The quantitative difference lies in the significantly greater fraction of the necessary fissile material which is formed and used in situ. This reduces the amounts of both fissile and fertile materials that must be fabricated for operating the reactor. Less fissile material needs to be fabricated because more of the fissile material created by the reactor is used in situ. Less fertile material must be fabricated than in conventional reactors since in conventional breeder reactors the blanket must be removed from the reactor periodically to prevent excessively high fission rates in the fissile material which is built up in the blanket; here, however, the blanket material is simply shifted so that the higher fission rate in the bred fissile material is a beneficial and necessary part of the reactor operation. Organized movement means here that mixing of fuels which have suffered different degrees of irradiation is minimized except possibly for the introduction of fresh fuel.

It is thus a principal object of this invention to provide in a breeder reactor a more efficient utilization of the fertile and fissile materials.

Another object is to provide a method of operating a breeder reactor in which the need for chemical processing and reconstitution of fuel material is reduced.

A further object of the invention is a manipulative scheme for operating a breeder reactor in which fissile and fertile materials are moved in regular intervals during operation of the reactor to obtain improved efficiencies in the utilization of the fuel.

Figure 2:
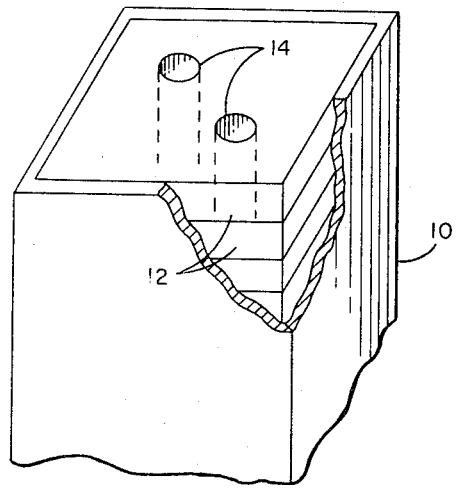

Other objects and advantages of this invention will hereinafter become obvious from the following description of preferred embodiments of this invention taken with the accompanying drawing in which:

FIG. 1 is a graph illustrating the distribution of fuel in a typical breeder reactor of the type described herein; and FIG. 2 is a suitable fuel assembly for carrying out this invention.

Referring to FIG. 1, there is shown for illustrative purposes only, a plot in solid lines of fissile plutonium 239 and fertile uranium 238 concentrations versus vertical position in a reactor at some particular instant. After a period of time the irradiation due to the neutron flux causes depletion of the fertile uranium and buildup of the fissile plutonium in such a fashion that the concentration profiles change as indicated by the dotted lines. For properly chosen initial concentration, a typical fuel element can be restored to its original state by discharging the fuel in the central (shaded) region, moving the rest of the fuel toward the center, and filling the remaining space with fresh fuel of low or zero plutonium content. Whenever the reactivity effect due to changes in isotopic composition changes by a predetermined amount, i.e., by predetermined control rod movement to maintain proper operating condition, the fuel would be moved in accordance with this invention. Fuel manipulation may be programmed to occur while the reactor is operating, or may be accomplished during a series of planned, short shutdowns of the reactor.

The rate at which fuel is shifted, i.e., number of inches per month, is determined by the breeding rate of the reactor. Thus, for a low breeding rate, the fuel must be shifted at a slow rate in order to allow sufficient plutonium to be built up to sustain the chain reaction in the reactor. For some fuels it will happen that the rate of fuel shifting must be so slow that the fuel would undergo excessive burnup if all of the plutonium were required to be produced in the direct process indicated here. In such cases enough plutonium can be introduced along with the fertile material to keep the fissile concentration high enough to sustain criticality without exceeding desirable burnup limits on the fuel.

In order to permit the manipulation of fuel in the manner described above, it is necessary, of course, to provide a nuclear reactor in which fuel is provided in a form which makes it possible to move the fuel to new positions. There are many reactor fuels available in which manipulation is possible. An example of a fuel assembly which can be used in a reactor and permit this invention to be practised is that shown by patent application S.N. 457,536 filed May 20, 1965, in the name of Warren E. Winsche, entitled "Ordered Bed Nuclear Fuel Assemblies."

Another type of arrangement which is possible is that illustrated in FIG. 2, in which the core of the reactor would consist of an assembly of extended tubes 10 having a square cross-section in which would be stacked a plurality of flat fuel modules 12. Openings 14 in modules 12 would permit the passage of coolant. Thus, to manipulate the arrangement of modules 12 in any particular box 10, all of the modules can be removed and stored temporarily outside of the reactor. The fully irradiated modules in the central portion of the box are put aside for export from the reactor. A number of fresh modules equal to half the number exported are put in the bottom of the box. The remaining original modules are re-inserted in the same relative order which they had before removal, and addition fresh modules are added to the top to fill the box. This scheme is most suitable for the case when only fertile material is added.

A suitable composition of the material comprising modules 12 for insertion initially would be uranium carbide as described in the following table:

TABLE

| | Number Density in atoms/$10^{-24}$ cm. | | |
|---|---|---|---|
| | Outer Region (Fresh Fuel) | Intermediate Region | Inner Region (At Discharge) |
| U-238 | 0.0263 | 0.0236 | 0.0209 |
| Pu-239 | 0 | 0.0011 | 0.0022 |
| Pu-240 | 0 | 0.0002 | 0.0004 |
| Fission Product | 0 | 0.0014 | 0.0028 |
| Carbon | 0.0263 | 0.0263 | 0.0263 |

An alternative scheme of manipulation also starts with removal of all the modules in the box and export of the fully irradiated ones in the central section. In this case fresh modules are added not only in the end sections but also at intermediate points above and below the central plane of the box. This scheme is suited to the cases in which fertile as well as more expensive fissile material are added, and the latter can be added at positions of higher statistical weight, nearer the center of the fuel element, and hence less of the fissile material is needed.

It is quite apparent that it is not necessary to carry out the fuel manipulation in all the fuel elements during any single reactor shut-down. Instead, the boxes may be reloaded on a staggered schedule so that only a few undergo manipulation at any one time. Reloading of the elements may be done while they are in the reactor provided the proper remotely operated machines are provided for transferring the modules back and forth, or the boxes may be removed from the reactor, replacements substituted for them, and the reactor can be started up and operated. The boxes that are removed then undergo fuel manipulation to make them ready as replacements for other fuel elements at the next shutdown.

It is thus seen that there has been provided a unique scheme for operating a breeder reactor in which there is a reduced need for the chemical processing and reconstitution of the fuel. While only preferred embodiments of the invention have been described, it is understood that the invention is not limited thereby but is to be defined only by the scope of the appended claim.

We claim:

A method of operating a breeder reactor utilizing fuel containing throughout the core modules of mixed fertile and fissile materials comprising the steps of moving at periodic intervals each of said fuel modules radially inwardly in both horizontal and vertical directions toward the center of reactivity of said core as the content of each said fuel module increases in fissile material, adding during said intervals fresh fuel modules containing substantially all fertile material to regions of the least reactivity effect, and withdrawing during said intervals the fuel modules in regions of maximum reactivity effect.

References Cited

UNITED STATES PATENTS

| 2,992,174 | 7/1961 | Edlund et al. | 176—18 |
| 2,992,982 | 7/1961 | Avery | 176—17 |
| 3,145,149 | 8/1964 | Imhoff | 176—73 |
| 3,158,543 | 11/1964 | Sherman et al. | 176—17 |
| 3,228,846 | 1/1966 | Bryan | 176—18 |

FOREIGN PATENTS

| 634,800 | 1/1962 | Canada. |
| 839,392 | 6/1960 | Great Britain. |

OTHER REFERENCES

AEC Document, NYO–9715, 1961, pp. 219, 266, 267, 292–294, 297, 312, 313, 316, 320–324, and 335.

CARL D. QUARFORTH, *Primary Examiner.*

L. DEWAYNE RUTLEDGE, *Examiner.*

H. E. BEHREND, *Assistant Examiner.*